Nov. 8, 1927.
A. GARRIC
1,648,384
GARDEN PLOW
Filed Oct. 29, 1921   2 Sheets-Sheet 1
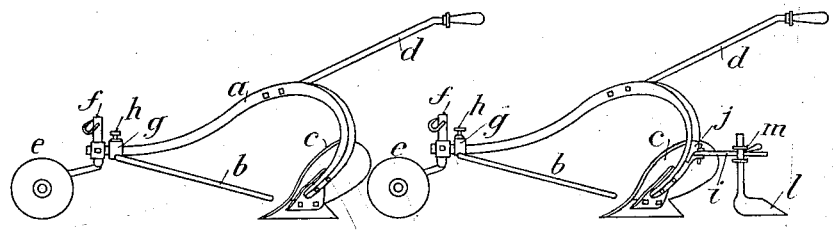
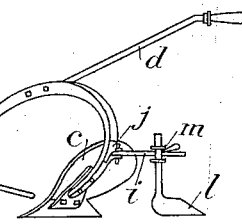
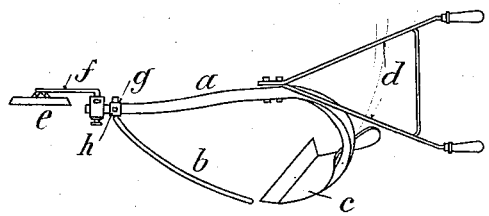
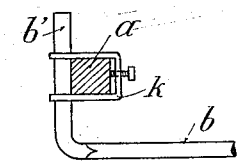
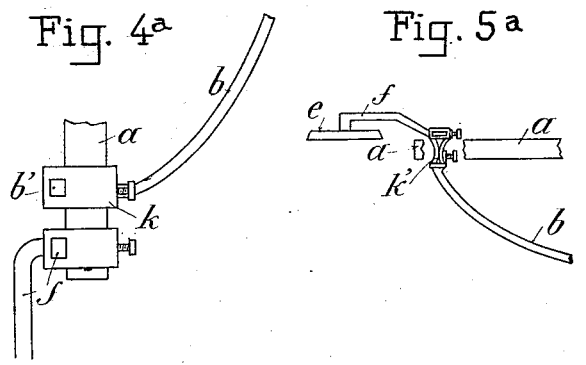
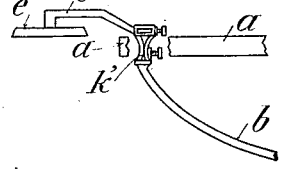
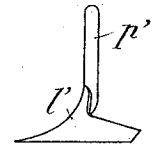
Inventor:
A. Garric
By Lawrence Langner
Attorney Nov. 8, 1927. 1,648,384
A. GARRIC
GARDEN PLOW
Filed Oct. 29, 1921   2 Sheets-Sheet 2
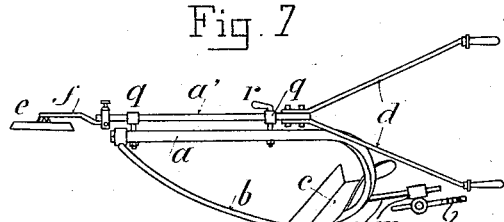
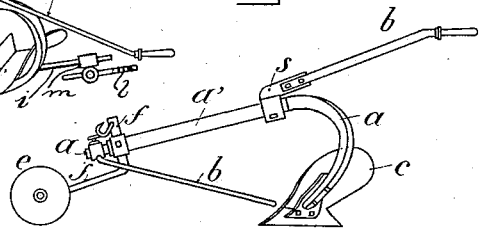
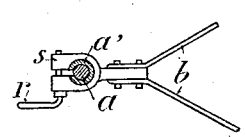
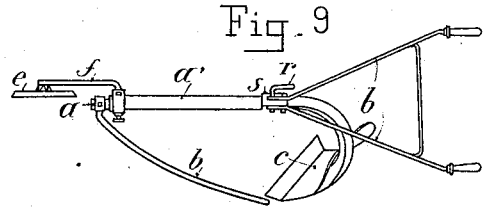
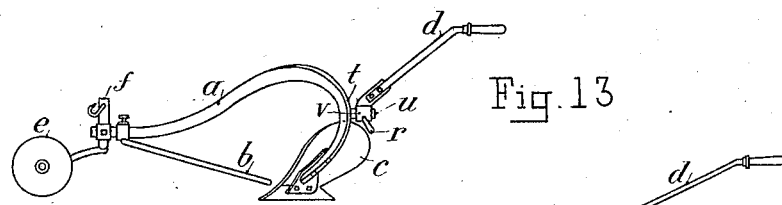
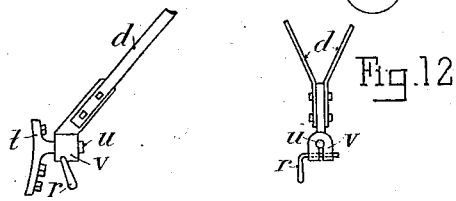
Inventor:
A. Garric
By Lawrence Langner
Attorney Patented Nov. 8, 1927.

1,648,384

UNITED STATES PATENT OFFICE.

ANDRÉ GARRIC, OF LAYRAC, FRANCE.

GARDEN PLOW.

Application filed October 29, 1921, Serial No. 511,323, and in France August 31, 1921.

This invention relates to the type of implement applicable for plowing between the rows of vine-stocks and called an inter-vine-stock plow, this type of plow consisting of three principal members, namely, a bent supporting frame, a guard for diverting the plow from the vine stocks, and a share. In plan these three members form a kind of curvilinear triangle. This invention has for its object various improvements applicable to the construction of the members forming this type of plow and enabling it to plow effectively on flat or sloping land; the invention also has for its object an improved assembly of the said members.

The accompanying drawings illustrate these improvements by way of example;

Figs. 1 and 2 show respectively in longitudinal elevation and in plan an inter-vine-stock plow provided with a share without a heel.

Fig. 3 shows in longitudinal elevation an inter-vine-stock plow of the same type provided with an oscillating trail or heel.

Fig. 3$^a$ shows to a larger scale a portion of the frame of the plow of Fig. 3, at the point of attachment of the support for the oscillating heel.

Fig. 4 and Fig. 4$^a$ show in elevation and plan, to a larger scale the connection of the guard to the frame, applicable to the plow of the type illustrated in Figs. 1, 2 and 3.

Fig. 5 and Fig. 5$^a$ show in elevation and plan, to a larger scale the connection of the guard to the wheel support applicable to a plow of the type shown in Figs. 1 and 3.

Figs. 6, 6$^a$ and 6$^b$ show modified forms of construction of the oscillating heel applicable to a plow of the type illustrated in Fig. 3.

Fig. 7 shows in plan a modified form of construction of the inter-vine-stock plow applicable for use on sloping plantations.

Figs. 8 and 9 show in elevation and plan another modified form of construction of the inter-vine-stock plow for sloping plantations illustrated in Fig. 7.

Fig. 9$^a$ is a section on the line $x$—$x$ of the frame of the plow shown in Figs. 8 and 9.

Fig. 10 shows in longitudinal elevation an inter-vine-stock plow of the type shown in Figs. 1 and 2 provided with a device permitting of inclining the handles so as to enable this plow to be used on sloping land.

Figs. 11 and 12 are respectively two vertical elevations of the device for attaching the handles to the frame, permitting of inclining the said handles.

Fig. 13 shows a modified form of construction of the inter-vine-stock plow wherein the wheel is hinged to the supporting rod mounted upon the frame.

In these figures, $a$ indicates the frame, $b$ the guard, and $c$ the share. The guard $b$ is adjustable, but during operation the three members referred to form a rigid unitary body. A pair of ordinary handles $d$ is fitted to the rear, and a wheel $e$ mounted at the end of a support $f$ is disposed at the front of this plow.

In the construction shown in Figs. 1 and 2, the end of the guard $b$ is round and is mounted in a collar $g$ by which it is secured underneath the frame $a$. A tightening screw $h$ permits of locking the whole as required and of varying the height of the guard which can be tilted around the collar $g$.

In Fig. 4, the guard $b$ is bent, its end $b'$ of square or flat section, bearing vertically against the frame $a$ shown in section. A collar $k$ connects these members together. In this arrangement, the guard $b$ is adjustable, not by tilting or oscillation as previously described but by a vertical displacement which permits of raising or lowering the whole of the guard parallel to the ground.

In Fig. 5, the guard $b$ is secured by the collar $k'$, not to the frame $a$, but to the wheel support $f$. The collar $k'$ may be raised or lowered along the support $f$ and during its vertical movement moves the guard parallel to the ground.

Moreover the end of the guard $b$ is round and can turn in the collar $k'$ which permits the guard $b$ to oscillate around its point of of attachment when operating pressure screws $k^2$.

In the modified form of construction shown in Figs. 3 and 3$^a$, the inter-vine-stock plow is provided with an oscillating trail or heel $b$ adjustable in all directions, having for its object the limitation of the depth of the trench and the lateral inter-vine-stock penetration without affecting the sinusoidal movement of the plow. This heel consists of a shaft $i$ pivoted in a socket $j$ rigidly secured to the rear of the share $c$ of the frame $a$. This socket permits the shaft $i$ to oscillate in a horizontal plane until it meets the abutments $m$ which limit as required the course of the shaft by means of screws $n$ mounted near the ends of these abutments; near the free end of the shaft $i$ is secured, by means of a tightening collar $o$, a suitably shaped member, in this case of the shape of a harrow prong (Fig. 6). The vertical portion or stem $p$ of this prong is cylindrical, which, when tightening the collar $o$, enables it to be secured in a more or less inclined position relatively to the tractive axis and to serve as a support for the harrow prong blade $l$. In this manner the lateral inter-vine-stock penetration is adjusted.

Moreover the member $l$ may be raised or lowered relatively to the shaft $i$. This adjustment permits of varying the depth of the trench.

The member $l$ may be replaced by a triangular member $l'$ (Fig. 6$^a$); this member affords the advantage of enabling one of its sides to be brought into contact with the vine-stocks and to plow the ground which may have been left by the share $c$.

In the modified form of construction illustrated in Fig. 7, and adapted for plowing sloping plantations the share $c$ may be inclined parallel to the sloping ground whilst the handles $d$ and the wheel $e$ are kept vertical, in such a manner that the members $d$ and $e$ remain vertical relatively to the centre of gravity irrespective of the inclination of the ground or of the share $c$. In order to attain this result the frame is provided with a secondary frame $a'$ of cylindrical section which is secured parallel to the main frame $a$ by means of collars $q$ which permit it to turn. One of the collars is provided with a pressure screw $r$ adapted to lock the frame $a'$ when required and to prevent it from turning. It is possible to employ any other suitable device enabling a cylindrical shaft to be locked; a split collar with a tightening screw, sector, etc.

The guard $b$ as also the share $c$ are secured to the main frame $a$. The wheel $e$ and its support $f$, as also the handles $d$, however, are secured to the secondary frame $a'$. If therefore, the screws $r$ are loosened the second group of members may be turned and laterally inclined relatively to the first group and they may be fixed rapidly in the best position.

In the modified form of construction of the inter-vine-stock plow illustrated in Figs. 8 and 9, the inclination of the share $c$ parallel to the ground is obtained by the following agency. The two frames $a$, $a'$ are arranged concentrically, the main frame $a$ which always supports the guard $b$ and the share $c$ being cylindrical in this case. The secondary frame $a'$, supporting the wheel $e$, its support $f$ and the handles $d$, consists of a tube in the interior of which is placed the main frame $a$. These frames may, as desired, turn one within the other or be locked together so as to form a rigid entirety by means of the tightening collar $s$. The tube is split underneath the collar $s$; a screw $r$ serves to draw together the two portions of the split tube.

In the modified form of construction of the inter-vine-stock plow illustrated in Figs. 10, 11 and 12 suitable for use on sloping ground a device is provided enabling the handles $d$ to be inclined transversely; this device consists of a member $t$ rigidly secured to the rear of the frame $a$ or to the share $c$. This member terminates in the form of a horizontal cylindrical shaft $u$ of which the axis is parallel to the line of traction; a collar $v$ secured to the handles $d$ is placed around the shaft $u$. The handles $d$ may thus oscillate laterally around the shaft $u$ and may be secured in the required position by means of a screw $r$ which securely connects the collar $v$, and consequently the handles, to the shaft $u$.

In the modified form of construction of this type of plow illustrated in Fig. 13, the rod supporting the wheel is bent in the form of a swan's neck $w$, which enables a shaft or beam for a team to be secured to its free end. This bent rod $w$ is secured to the frame by means of hinges $x$ which enable the frame to carry out horizontal movement whilst the wheel $e$ and its bent support $w$ remain in the plane of the line of traction. The hinge $x$ may be replaced by a pivot provided on the rod $w$ or on the frame $a$ and adapted to move in a socket formed on the frame $a$ or on the rod $w$.

What I claim is:—

1. In an orchard plow, comprising in combination a share a guard and a supporting frame constituting a unitary body, a vertically adjustable heel pivotally mounted on the body at the rear of the share with freedom to oscillate laterally, and stops for limiting the extent of oscillation.

2. An orchard plow comprising in combination a share a guard and a supporting frame constituting a unitary body, handles, a forward wheel, and a supporting frame forming a secondary unitary body, said bodies being assembled together adjustably with respect to each other.

3. An orchard plow comprising in combination a share a guard and a supporting frame constituting a unitary body, handles, a forward wheel, and a supporting frame forming a secondary unitary body, and means connecting the two bodies so that one body can move angularly with respect to the other body.

4. An orchard plow comprising in combination a share a guard and a supporting frame constituting a unitary body, handles, a forward wheel, and a supporting frame forming a secondary unitary body, the frame of one body being mounted parallel to the frame of the other body and free to turn thereon.

Signed at Bordeaux, Gironde, France, this 4th day of October, A. D. 1921.

ANDRÉ GARRIC.